United States Patent [19]

Matsumoto

[11] 4,414,622
[45] Nov. 8, 1983

[54] ADDRESSING SYSTEM FOR A COMPUTER, INCLUDING A MODE REGISTER

[75] Inventor: Keiji Matsumoto, Tokyo, Japan

[73] Assignee: Nippon Electric Co., Ltd., Tokyo, Japan

[21] Appl. No.: 235,377

[22] Filed: Feb. 19, 1981

Related U.S. Application Data

[63] Continuation of Ser. No. 956,157, Oct. 31, 1978, abandoned.

[30] Foreign Application Priority Data

Oct. 31, 1977 [JP] Japan ............... 52-131190

[51] Int. Cl.³ ............................................ G06F 9/26
[52] U.S. Cl. ............................................... 364/200
[58] Field of Search .......................... 364/200, 900

[56] References Cited

U.S. PATENT DOCUMENTS

| | | | |
|---|---|---|---|
| 3,949,378 | 4/1976 | Crabb | 364/200 |
| 4,031,514 | 6/1977 | Kihara | 364/200 |
| 4,079,451 | 3/1978 | Woods et al. | 364/200 |

OTHER PUBLICATIONS

7ILOG Inc. Calif., "780-CPU Technical Manual" pp. 21-22.
J. Dirac, "Call Instruction", IBM Technical Disc. Bulletin, vol. 8 No. 12 May 1966.

Primary Examiner—James D. Thomas
Assistant Examiner—David Y. Eng
Attorney, Agent, or Firm—Sughrue, Mion, Zinn, Macpeak and Seas

[57] ABSTRACT

For generating a working address in a central processing unit of a computer by combining the content of a specified one of a plurality of relocation registers with the content of one of a plurality of general purpose registers that is specified by a datum given to the central processing unit, an addressing system comprises a mode register for producing a register output signal at a time, a decoder for deriving a decoder output signal from the datum, and a selecting circuit responsive to the register and the decoder output signals for selecting one of the relocation registers as the specified relocation register. Preferably, combinations of the signals produced by the mode register and those derived by the decoder from the data specifying at least predetermined ones of the general purpose registers are in one-to-one correspondence to the relocation registers. When the mode register has a plurality of one-bit memory cells, a mode register signal stored in the mode register may be changed by storing a one-bit signal derived from a result of operation of the central processing unit in one of the mode register memory cells that is selected by the decoder output signal.

8 Claims, 2 Drawing Figures

ADDRESSING SYSTEM FOR A COMPUTER, INCLUDING A MODE REGISTER

This is a continuation, of application Ser. No. 956,157, filed Oct. 31, 1978, now abandoned.

BACKGROUND OF THE INVENTION

This invention relates to an addressing system for generating in a central processing unit of an electronic digital computer a working address from an instruction.

It is conventional when an instruction is read out for a central processing unit of an electronic digital computer from a memory that an instruction register is loaded with the instruction. A desired one of many general purpose registers is specified by a datum stored therefor in a data field of the instruction register. The working address is generated by combining the content of the specified general purpose register with the content of a relocation register to specify an address of the memory for reading out a datum stored in the specified address of the memory. The read-out datum is supplied either to the central processing unit for calculation or to another general purpose register for storage therein. Alternatively, the read-out datus is otherwise used.

In a sophisticated addressing system, use is made of only one relocation register loaded, at a time, with a certain number A. If the content of the specified general purpose register represents a number N, an address $A+N$ is generated by usually calculating the sum of the contents. It is possible to either add one to the content of the specified general purpose register or subtract one therefrom to successively generate consecutive addresses for such a sum $A+N$. These addresses will be referred to as the addresses in a region of the address A. It is also possible to specify in the meantime another general purpose register loaded with another number S and thereby to generate a new address $A+S$. The content of the relocation register has to be changed when jump is required from the region of the address A to another region of a different address B. The change has been carried out by execution of the program. It has therefore been necessary to repeatedly change the content of the relocation register by the program when it is desired to alternatingly have access to the regions of the addresses A and B, such as in the order of addresses $A+N$, $B+N$, $A+N+1$, $B+N+1$, .... This has inevitably resulted in a reduction in the speed of operation. In addition, the repeated change lengthens the program. This means that a wider memory area is necessary for the program.

In a pamphlet published in 1977 by Zilog Inc., Calif., U.S.A., under the title of "Z80-CPU Technical Manual," use is taught of "Indexed Addressing" on pages 21-22. According to the teaching, two index registers are used in place of a single relocation register described hereinabove. One of the index registers is specified by the OP code of an instruction given to the central processing unit. The content of the specified index register is added to the displacement datum contained in the instruction to form a pointer to the memory. As described in the pamphlet, the indexed addressing simplifies the program when it is necessary to have access to two or more tables.

It is to be noted in connection with the indexed addressing that either of the index registers is specified independently of specification for the general purpose registers. This means that an additional program step is indispensable to specify the index register besides a program step for specifying a general purpose register. In other words, it is insufficient even by the use of the indexed addressing to shorten the program to a considerable extent and to do with a narrowest possible memory area.

SUMMARY OF THE INVENTION

It is therefore an object of the present invention to provide an addressing system for use in a central processing unit of an electronic digital computer, comprising a plurality of relocation registers one of which is automatically specified when one of general purpose registers of the central processing unit is selected.

It is another object of this invention to provide an addressing system of the type described, which is capable of flexibly generating addresses in various regions without changing the contents of the respective relocation registers.

It is still another object of this invention to provide an addressing system of the type described, with which it is possible to simplify programs for the computer to a remarkable extent and to astonishingly reduce the area of a memory for the computer.

Other objects and the salient features of this invention will become clear as the description proceeds.

An addressing system to which this invention is applicable is one for generating a working address in a central processing unit of an electronic digital computer by combining the content of a specified one of many relocation registers with the content of one of many general purpose registers which is specified by a datum given to the central processing unit. According to this invention, the system comprises register means for producing a register output signal at a time, a decoder for decoding the datum to produce a decoder output signal, and selecting means responsive to the register output and the decoder output signals for selecting one of the relocation registers as the specified relocation register.

DESCRIPTION OF THE PREFERRED EMBODIMENTS

Figures 1, 2:
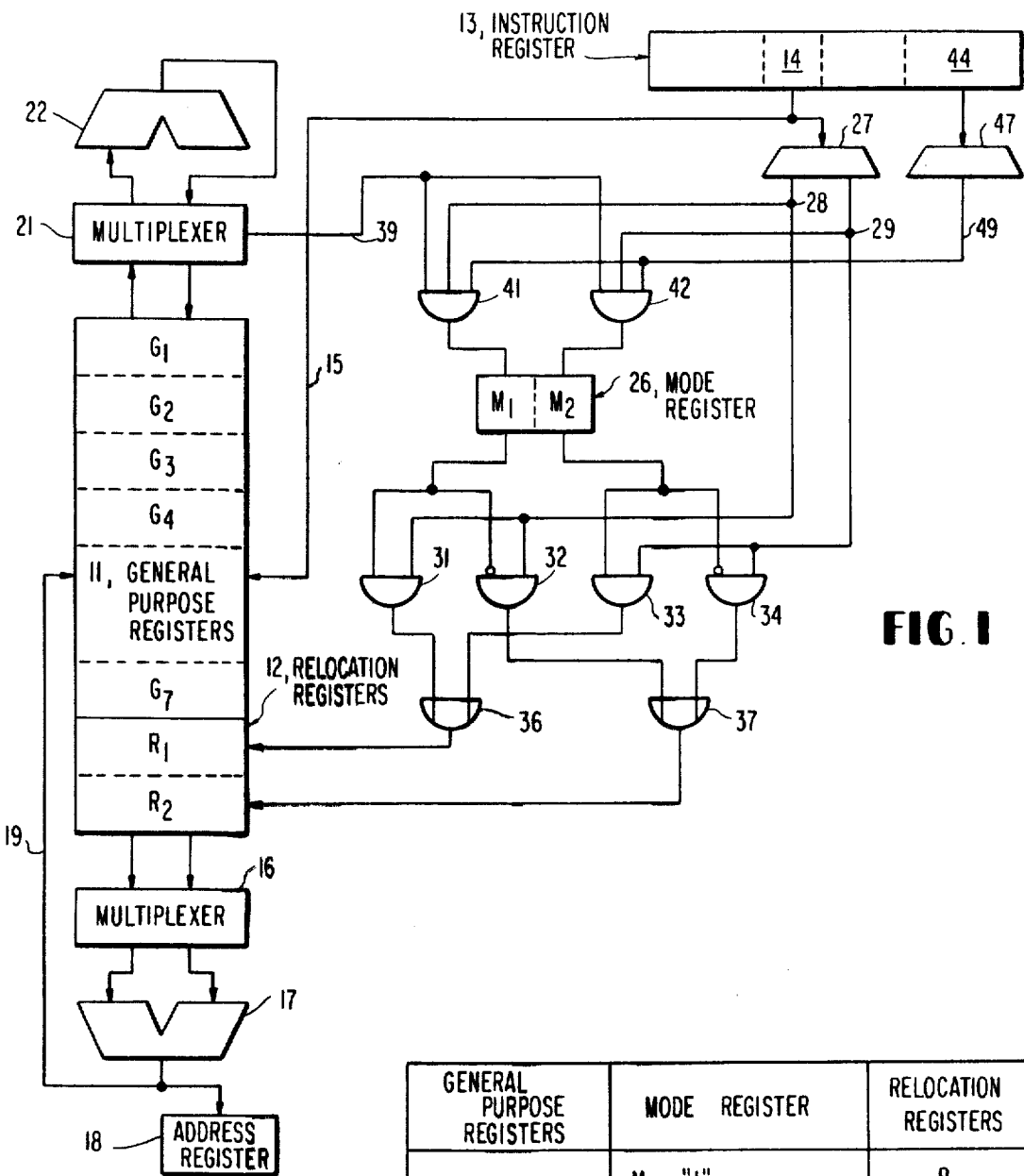
FIG. 1 shows, partly in blocks, an addressing system according to an embodiment of the instant invention together with several other parts of a central processing unit of an electronic digital computer.
FIG. 2 exemplifies the contents of one-bit mode registers of the addressing system shown in FIG. 1 in connection with specified general purpose and relocation registers.

Referring to FIG. 1, a central processing unit of an electronic digital computer comprises a plurality of general purpose registers 11. In the example being illustrated, use is made of first through seventh general purpose registers $G_1$, $G_2$, $G_3$, $G_4$, ..., and $G_7$, namely, odd-numbered general purpose registers $G_1$, $G_3$, ..., and $G_7$ and even-numbered ones $G_2$, $G_4$, and so on. An addressing system according to an embodiment of the present invention comprises a plurality of relocation registers 12, such as first and second relocation registers $R_1$ and $R_2$, in the central processing unit. While a program is read out of a memory (not shown) by means known in the art, an instruction register 13 is loaded with an instruction contained in the program. The instruction includes a datum stored in a data field 14 of the instruction register 13 for specifying one of the general purpose registers 11 by the number given thereto through known means depicted by a line 15. The specified general purpose register supplies its content to a first shift and multiplexer 16. In the meanwhile, the content of one of the relocation registers 12 is read out in the manner later described and is supplied to the shift and multiplexer 16, which is operable either in a space or a time division fashion. A first arithmetic logic unit 17 combines these contents as by calculating a sum of the contents. The result of combination is stored in an address register 18. It is possible to add one to the content of the specified general purpose register. The latter sum is returned back to the specified general purpose register through a connection 19 to make the general purpose register serve as a program counter. The content of the specified general purpose register is supplied also to a second shift and multiplexer 21 and thence to a second arithmetic logic unit 22 by which the content is used to carry out calculation. It is possible to store the result of calculation in the specified general purpose register by returning the result back thereto through the second shift and multiplexer 21.

As illustrated in FIG. 1, the addressing system comprises a mode register 26. The illustrated mode register 26 has two memory cells, which may be called first and second one-bit mode registers $M_1$ and $M_2$. Each memory cell may be a flip-flop which is set and reset as desired to produce one or the other of logic "1" and "0" signals. The mode register 26 is thus loaded with a mode register signal representative of binary "11," "10," "01," or "00" and is capable of producing register output signals representative of binary "11," "10," "01," and "00." The general purpose register specifying datum stored in the data field 14 of the instruction register 13 is decoded by a decoder 27 to give a high and a low level signal to first and second decoder output terminals 28 and 29, respectively, when the datum specifies, for example, one of the odd-numbered general purpose registers $G_1, G_3, \ldots,$ and $G_7$. In this event, the low and the high level signals are supplied to the first and the second decoder output terminals 28 and 29, respectively, when the datum specifies one of the even-numbered general purpose registers $G_2, G_4,$ and others. The high level signal may be the logic "1" signal and the low level signal, the logic "0" signal.

Further referring to FIG. 1, it is possible to presume without loss of generality that the first and the second one-bit mode registers $M_1$ and $M_2$ are selected when the high level signal is supplied to the first and the second decoder output terminals 28 and 29, respectively. The selection is carried out by enabling, by the high level signal, one of a set of first and second output AND gates 31 and 32 and another set of third and fourth output AND gates 33 and 34. It is possible to use only two of the above-exemplified register output signals that represent binary "10" and "01." Under the circumstances, the content of the first one-bit mode register $M_1$ is supplied to the first and the second AND gates 31 and 32 directly and after inverted, respectively. Likewise, the content of the second one-bit mode register $M_2$ is supplied to the third and the fourth AND gates 33 and 34 directly and after inverted, respectively. The output signal of either of the first and the third AND gates 31 and 33 serves as a first selection signal for selecting or specifying the first relocation register $R_1$ through a first OR gate 36 and the output signal of either of the second and the fourth AND gates 32 and 34, as a second selection signal that selects the second relocation register $R_2$ through a second OR gate 37.

Turning temporarily to FIG. 2, let it be assumed more specifically that the datum stored in the data field 14 of the instruction register 13 specifies the first general purpose register $G_1$. In this case, the high level signal is supplied to the first decoder output terminal 28 to enable the first and the second output AND gates 31 and 32 and thereby to select the first one-bit mode register $M_1$. If the first mode register $M_1$ is producing the logic "1" signal, the first relocation register $R_1$ is specified through the first AND gate 31 and the first OR gate 36. If the content of the first mode register $M_1$ is logic "0," the method relocation register $R_2$ is specified through the second AND and OR gates 32 and 37. When the third general purpose register $G_3$ is specified, the first and the second relocation registers $R_1$ and $R_2$ are similarly specified according as the content of the first mode register $M_1$ is logic "1" and "0," respectively. When the content of the data field 14 specifies one of the even-numbered general purpose registers $G_2, G_4,$ and so forth, it is now clear that the second one-bit mode register $M_2$ is selected. It is also obvious in this event that the first and the second relocation registers $R_1$ and $R_2$ are specified when the logic "1" and "0" signals are produced, respectively, by the second mode register $M_2$.

Turning back to FIG. 1, it is possible to change the contents of the respective one-bit mode registers $M_1$ and $M_2$ by a mode register content change instruction included for this purpose in the program. It is also possible to correlate the change to a pair of data contained in the mode register content change instruction. By way of example, a datum stored in the data field 14 of the instruction register 13 is used as usual to specify one of the general purpose registers 11. A lead wire 39 is supplied with the most significant bit of the content of the second shift and multiplexer 21 transferred from the specified general purpose register. The lead wire 39 supplies the most significant bit to first and second input AND gates 41 and 42, which have outputs connected to the first and the second one-bit mode registers $M_1$ and $M_2$, respectively. The high level signal supplied to the first and the second decoder output terminals 28 and 29 serves as a first enabling signal for a corresponding one of the first and the second input AND gates 41 and 42 to select one of the first and the second one-bit mode registers $M_1$ and $M_2$. The instruction includes another datum stored in an operand field 44 of the instruction register 13, which datum is decoded by a second decoder 47 to supply a single decoder output terminal 49 thereof with a logic "1" signal as second enabling signals for the respective input AND gates 41 and 42 only when it is desired to change the content of the selected one-bit mode register $M_1$ or $M_2$. When the first and the single decoder output terminals 28 and 49 are given the logic "1" signals, the first input AND gate 41 renders the content of the first one-bit mode register $M_1$ coincident with the most significant bit of the content of the odd-numbered general purpose register, such as $G_1, G_3,$ or $G_7$, specified by the datum stored in the data field 14. When the second and the single decoder output terminals 29 and 49 are supplied with the logic "1" signals, the content of the second one-bit mode register $M_2$ is brought into coincidence with the most significant bit of the even-numbered general purpose register, such as $G_2$ or $G_4$, specified by the datum of the data field 14.

It is now understood that a desired one of the relocation registers 12 is automatically specified by cooperation of the general purpose register specifying datum stored in the data field 14 and a register output signal of the mode register 26. This means that access to addresses of various regions is possible without changing the contents of the relocation registers 12 by specific instructions put into a program being executed. It is therefore possible to simplify and shorten the program, to reduce the memory area, and to raise the speed of operation. In addition, more flexible access to various address regions is possible by readily making the mode register 26 produce various register output signals.

From FIG. 1, it is readily understood that the data successively stored in the data field 14 of the instruction register 13 may be decoded in various manners. The signals supplied to the respective decoder output terminals, such as 28 and 29, of the decoder 27 may be called a decoder output signal as a whole. The output AND gates 31 through 34 serve as a decoder for decoding various combinations of the register output signals of the mode register 26 and the decoder output signals of the decoder 27 to produce selection signals preferably in one-to-one correspondence to the relocation registers 12.

The description thus far made will make it possible to derive various other embodiments of this invention therefrom. For example, the input AND gates 41 and 42 may be used to select a desired one of the one-bit mode registers $M_1$ and $M_2$ by a result of arithmetic logic operation carried out by the arithmetic logic unit 17 or 22. More particularly, the result stored in the specified one of the general purpose registers 11 may be supplied to the input AND gates 41 and 42 through the second multiplexer 21 to select one from the one-bit mode registers $M_1$ and $M_2$ in cooperation with the high level signal suplied to one of the first and the second decoder output terminals 28 and 29. It is thereby possible to simplify the process of specifying a desired one of the relocation registers 12 and to remarkably raise the speed of operation and the efficiency of the program steps in contrast to complicated processes, used in a conventional addressing system, of judging the result of the arithmetic logic operation by the central processing unit, reading out an instruction with reference to the result of the judgement, and then decoding the instruction. The number of the relocation registers 12 may be three or more.

What is claimed is:

1. An addressing system for generating a working address in a central processing unit of an electronic digital computer, said central processing unit comprising a plurality of general purpose registers (11) each storing general purpose register contents therein, a plurality of relocation registers (12) each storing relocation register contents therein, an instruction register (13) for storing a program instruction including a mode register content change instruction (44), and general purpose register specifying means (14, 15) responsive to at least a portion of said program instruction for specifying one of said general purpose registers, said addressing system comprising:

mode register means (26) for producing a plurality of mode register output signals at one time;

a first decoder (27) responsive to said portion of said program instruction for producing a decoder output signal designating one mode register output signal to be selected from the mode register output signals currently being produced by said mode register means;

selecting means (31-34) responsive to said first decoder output signal for selecting said one mode register output signal and for reproducing a selection signal in accordance with said one mode register output signal;

means (36, 37) responsive to said selection signal for selecting one of said relocation registers;

means (16, 17) for combining the contents of the specified general purpose register and the selected relocation register to generate said working address;

result signal producing means (22) responsive to the content of the general purpose register specified by said portion of said program instruction for producing a result signal; and gating means (41, 42) enabled by said decoder output signal and said mode register content change instruction for providing at least a portion of said result signal to said mode register means for use in changing at least one of said mode register output signals.

2. An addressing system as claimed in claim 1, wherein said portion of said result signal is a one-bit signal and wherein said mode register means comprises a plurality of one-bit registers for selectively storing said one-bit portion of said result signal, said decoder output signal specifying one of said one-bit registers, said gating means being enabled by said mode register content change instruction to store said one-bit portion of said result signal in the one-bit register specified by said decoder output signal.

3. An addressing system for generating a working address by combining the content of a specified one of a plurality of relocation registers (12) with the content of a specified one of a plurality of general purpose registers (11), said addressing system comprising a plurality of mode register means (26) for storing information ($M_1$, $M_2$) for selecting one of said relocation registers, means (39, 41, 42) for supplying said information to said mode register means in accordance with the content of a first of said general purpose registers, a first instruction register (13) for storing a first instruction (14) for selecting one of said general purpose registers, first selecting means (15) for selecting said specified one of said plurality of general purpose registers in accordance with said first instruction, second selecting means (27, 31-37) for selecting said specified one of said plurality of relocation registers in accordance with the content of at least one of said mode register means, and combining means (17) for combining the content of said specified relocation register with the content of said specified general purpose register to obtain said working address.

4. An addressing system as claimed in claim 3, wherein said selecting means comprises decoding means (31-34) for decoding a combination of said mode register output and said decoder output signals to produce a selection signal and means (36, 37) responsive to said selection signal for selecting said one relocation register.

5. An addressing system as claimed in claim 3, wherein said first general purpose register is said specified general purpose register.

6. An addressing system as claimed in claim 5, wherein said content of said specified general purpose register comprises a plurality of bits and said means for supplying said information to said mode register means comprises gate means (41, 42) for receiving at least one bit of said plurality of bits and supplying said at least one bit to said mode register means in accordance with at least said first instruction.

7. An addressing system as claimed in claim 6, wherein said first instruction register further stores a second instruction (44) and said gate means provides said at least one bit to said selected one of said mode register means also in accordance with said second instruction.

8. An addressing system as claimed in claim 7, wherein, in response to said second instruction, said gate means provides said at least one bit to said selected one of said mode register means, and said selected one of said mode register means is the same as said at least one of said mode register means.

* * * * *

UNITED STATES PATENT AND TRADEMARK OFFICE
CERTIFICATE OF CORRECTION

PATENT NO. : 4,414,622

DATED : November 8, 1983

INVENTOR(S) : Keiji Matsumoto

It is certified that error appears in the above-identified patent and that said Letters Patent is hereby corrected as shown below:

Column 1, line 25, "datus" should be --datum--.

Column 4, line 14, "method" should be --second--.

Column 6, line 5, "reproducing" should be --producing--.

Signed and Sealed this

Third Day of April 1984

[SEAL]

Attest:

GERALD J. MOSSINGHOFF

Attesting Officer

Commissioner of Patents and Trademarks